United States Patent [19]

Mikofalvy et al.

[11] 4,076,920

[45] Feb. 28, 1978

[54] PROCESS FOR PRODUCING HOMO- OR COPOLYMERIZATION OF VINYL OR VINYLIDENE HALIDES HAVING REDUCED POLYMER BUILD-UP IN THE REACTOR

[75] Inventors: Bela Kalman Mikofalvy, Sheffield Lake; Thomas Joseph Doyle, Lorain, both of Ohio

[73] Assignee: The B. F. Goodrich Company, Akron, Ohio

[21] Appl. No.: 792,361

[22] Filed: Apr. 29, 1977

Related U.S. Application Data

[63] Continuation-in-part of Ser. No. 737,951, Nov. 2, 1976, abandoned, which is a continuation of Ser. No. 592,183, July 1, 1975, abandoned.

[51] Int. Cl.$^2$ .................... C08F 2/00; C08F 14/06; C08L 91/00
[52] U.S. Cl. .................. 526/74; 260/18 PF; 260/23 EM; 526/75; 526/88; 526/212; 526/344
[58] Field of Search ............... 526/212, 75, 74, 88, 526/344; 260/23 EM, 18 PF

[56] References Cited

U.S. PATENT DOCUMENTS

| | | | |
|---|---|---|---|
| 2,674,585 | 4/1954 | Condo et al. | 526/344 |
| 2,957,858 | 10/1960 | O'Donnell | 260/23 EM |
| 3,793,274 | 2/1974 | Hiyama et al. | 260/23 EM |

*Primary Examiner*—Herbert J. Lilling
*Attorney, Agent, or Firm*—Roy P. Wymbs

[57] ABSTRACT

There is disclosed a process for preparing vinyl dispersion resins by conducting the polymerization reaction of the vinyl monomer or monomers in an aqueous alkaline medium, using an oil-soluble polymerization initiator, at temperatures preferably below about 48° C., in the presence of an emulsifier system comprising the ammonium salt of a high fatty acid containing from 8 to 20 carbon atoms and at least one long chain alcohol containing from 14 to 24 carbon atoms, wherein the ratio of alcohol to emulsifier is equal to or greater than 1.0 and wherein the reaction ingredients are thoroughly mixed, and preferably homogenized, prior to polymerization. The process produces paste resins having improved heat stability and flow properties and capable of producing films having high clarity and improved water resistance. More importantly, polymer build-up in the reactor is substantially reduced and multiple polymerizations can be run in the reactor without opening the same.

14 Claims, No Drawings

PROCESS FOR PRODUCING HOMO- OR COPOLYMERIZATION OF VINYL OR VINYLIDENE HALIDES HAVING REDUCED POLYMER BUILD-UP IN THE REACTOR

CROSS REFERENCE TO RELATED APPLICATIONS

This application is a continuation-in-part of our co-pending application Ser. No. 737,951, filed Nov. 2, 1976 now abandoned, which in turn is a continuation application of our application Ser. No. 592,183, filed July 1, 1975, now abandoned.

BACKGROUND OF THE INVENTION

It is well known that vinyl resins may be plasticized or changed from the hard, horny and stiff state to a soft, plastic workable condition by the addition thereto at elevated temperatures of certain plasticizers, such as dioctyl phthalate, and the like. These vinyl polymers or resins are referred to as dispersion resins or paste resins and are usually made employing an emulsion polymerization technique, although a suspension polymerization process can be used.

When the vinyl resin is mixed or blended with a plasticizer, it is referred to as a "plastisol". By virtue of the flowability of the plastisol it can be processed into various useful products. The plastisols can be used in making molded products, coatings, and the like. Accordingly, the dispersion resin must be capable of being mixed with a plasticizer easily and uniformly to form low viscosity plastisols which are stable, containing particles of uniform and proper size, and capable of producing films, and like products, of good clarity.

With the customary emulsion polymerization processes, suitable latices have been difficult to obtain since the latices usually contain particles of varying size and are either too fine or too large. Various proposals have heretofore been made to overcome these difficulties but not with the ultimate success desired. For example, the use of various different emulsifiers and catalysts have been proposed. Also, varying the conditions of polymerization has been suggested. However, in most of these cases, too much coagulation occurred with the resulting latex containing too much coagulum or partially agglomerated particles which precipitate reducing the yield. Further, the shelf-life of such latices leave much to be desired. It is desirable to have latices which change very little during storage with respect to viscosity and have and maintain good heat stability.

Another frustrating and detrimental problem in the commercial production of polymers and copolymers of vinyl and vinylidene halides, when polymerized alone or with other vinylidene monomers having a terminal $CH_2=C<$ group, is the formation of undesirable polymer build-up on the inner surfaces of the reactor. This deposit or build-up of polymer on said reactor surfaces not only interferes with heat transfer, but also decreases productivity and adversely affects polymer quality, such as producing finer particles than desired with the resultant adverse effect on viscosity. Obviously, this polymer build-up must be removed. If not, more build-up occurs rapidly on that already present resulting in a hard, insoluble crust.

In the past it was the practice to have an operator enter the reactor and scrape the polymer build-up off the walls and off the baffles and agitators. This operation was not only costly, both in labor and down-time of the reactor, but presented potential health hazards as well. Various methods have heretofore been proposed to remove the polymer build-up, such as solvent cleaning, various hydraulic and mechanical reactor cleaners, and the like, but none has proved to be the ultimate in polymer build-up removal. It would be desirable, of course, to have a polymerization process in which polymer build-up does not occur. Unfortunately, none of the known emulsion polymerization processes are capable of solving this, and the other problems reiterated above. There is a definite need in the art for a polymerization process which meets all these criteria.

SUMMARY OF THE INVENTION

We have unexpectedly found that when a proper combination of polymerization conditions and ingredients are employed, latices can be produced which have all the necessary and desirable properties and with little or no polymer build-up. The process of the present invention comprises conducting the polymerization reaction of the vinyl monomer or monomers in an aqueous alkaline medium, using a free radical yielding polymerization initiator, at a temperature below about 48° C., in the presence of the ammonium salt of a high fatty acid containing from 8 to 20 carbon atoms, and at least one long chain alcohol containing from 14 to 24 carbon atoms, wherein the ratio of alcohol to emulsifier is equal to or greater than 1.0, and wherein the reaction ingredients are thoroughly mixed prior to polymerization. The dispersion resins, or paste resins, so produced have improved flow properties and heat stability and are capable of producing films having excellent clarity and improved water resistance. When employing said process, the polymer build-up in the reactor is substantially reduced and multiple polymerizations can be run in the reactor without opening the same thereby substantially reducing the amount of vinyl chloride in the surrounding atmosphere.

DETAILED DESCRIPTION

In the present invention, "vinyl dispersion resin" refers to polymers and copolymers of vinyl and vinylidene halides, such as vinyl chloride, vinylidene chloride, and the like. The vinyl halides and vinylidene halides may be copolymerized with one or more vinylidene monomers having at least one terminal $CH_2=C<$ grouping. As examples of such vinylidene monomers may be mentioned the $\alpha,\beta$-olefinically unsaturated carboxylic acids, such as acrylic acid, methacrylic acid, ethacrylic acid, $\alpha$-cyanoacrylic acid, and the like; esters of acrylic acid, such as methyl acrylate, ethyl acrylate, butyl acrylate, octyl acrylate, cyanoethyl acrylate, and the like; esters of methacrylic acid, such as methyl methacrylate, butyl methacrylate, and the like; nitriles such as acrylonitrile and methacrylonitrile; acrylamides, such as methyl acrylamide, N-methylol acrylamide, N-butoxy methacrylamide and the like; vinyl ethers, such as ethyl vinyl ether, chloroethyl vinyl ether, and the like; the vinyl ketones; styrene and styrene derivatives including $\alpha$-methyl styrene, vinyl toluene, chlorostyrene, and the like; vinyl naphthalene, allyl and vinyl chloroacetate, vinyl acetate, vinyl pyridine, methyl vinyl ketone, and other vinylidene monomers of the types known to those skilled in the art. The present invention is particularly applicable to the manufacture of vinyl dispersion resins or pastes made by the polymerization of vinyl chloride or vinylidene chloride alone or in admixture with one or more vinylidene monomers copolymerizable therewith in amounts as great as about 80% by weight, based on the weight of the monomer mixture. The most preferred vinyl dispersion resin is polyvinyl chloride and the invention, for simplicity and convenience, will be described in connection therewith, it being understood that this is merely intended in an illustrative sense and not limitative.

The present process for preparing vinyl dispersion resins is by means of the emulsion polymerization technique in an aqueous medium. However, in the instant invention it is necessary that certain specified materials are present in the polymerization medium and certain conditions of polymerization must be met in order to achieve the desired results.

In the polymerization recipe it is necessary to employ a fatty acid derivative as an emulsifier. In order to get the proper and improved water resistance and heat stability in films made from plastisols or latices of the vinyl dispersion resins the ammonium salt of a long chain saturated fatty acid is employed. We have found that if you use the alkali metal salts of the fatty acids you get discolored or yellow films from said plastisols. Further, the water resistance of films fails even if only traces of alkali metal is present. That is to say there must be a complete absence of alkali metal ions. The saturated fatty acids useful in the present invention may be either natural or synthetic and should contain from 8 to 20 carbon atoms. As examples of such acids there may be named lauric, myristic, palmitic, marganic, stearic, and the like, beef tallow, coconut oil, and the like. The ammonium salt emulsifier is employed in an amount in the range of about 0.5% to about 4.0% by weight based on the weight of the monomer or monomers being polymerized. It is also possible to use mixtures of the ammonium salts of the fatty acids in the emulsifier system.

The ammonium salt can be made by mixing the fatty acid and ammonium hydroxide, separating the salt and adding to the polymerization medium in usual fashion. However, it is preferred to form the ammonium salt in situ, that is, the fatty acid and ammonium hydroxide are added separately to the polymerization mixture or medium wherein they react to form the salt. An excess of ammonium hydroxide over the equimolar amount with the fatty acid should be employed. This excess helps to maintain the reaction medium on the alkaline side which is important, as discussed below.

In addition to the ammonium salt of a long chain fatty acid emulsifier, a long straight chain saturated alcohol containing from 14 to 24 carbon atoms is employed in combination therewith. Examples of such alcohols are tetradecanol, pentadecanol, hexadecanol, heptadecanol, octadecanol, nonadecanol, eicosanol, heneicosanol, docosanol, tricosanol, and tetracosanol. Mixtures of the alcohols can be employed. For example, a 14 carbon alcohol and an 18 carbon alcohol. Also, lower carbon content alcohols can be employed when mixed with the longer chain alcohols. For example, a mixture of dodecanol and octadecanol.

While a ratio of alcohol to the ammonium salt of the fatty acid of 1.0 can be used, the best results are obtained when said ratio is greater than 1.0.

In the practice of the present invention, the polymerization reaction is conducted at a high pH. The process can be conducted at a pH in the range of about 7.0 to about 12.0. However, it is preferred to operate in a pH range of about 8.0 to about 10.5. If the pH is too high it takes too much NH$_4$OH and if the pH is too low, for example, below 7.0, the polymer build-up in the reactor increases and the coagulum increases. The amount of NH$_4$OH needed to properly adjust the pH will depend in part on the particular emulsifier system being used in the reaction mixture.

The process described herein is conducted in the presence of a compound capable of initiating the polymerization reaction. Free radical yielding initiators, normally used for polymerizing olefinically unsaturated monomers, are satisfactory for use in the present process, provided they do not contain alkali metals, such as sodium and potassium, and the like. The useful initiators or catalysts include, for example, the various peroxygen compounds, such as lauryl peroxide, isopropyl peroxydicarbonate, benzoyl peroxide, t-butyl hydroperoxide, t-butyl peroxypivalate, cumene hydroperoxide, t-butyl diperphthalate pelargonyl peroxide, 1-hydroxycyclohexyl hydroperoxide, and the like; azo compounds, such as azodiisobutyronitrile, dimethylazodiisobutyrate, and the like. Also useful initiators are the water-soluble peroxygen compounds, such as hydrogen peroxide, persulfates, such as potassium persulfate, ammonium persulfate, and the like. The amount of initiator used will generally be in the range between about 0.01% to about 0.5% by weight, based on the weight of 100 parts of monomer or monomers being polymerized, and preferably between about 0.02% and about 0.1% by weight.

In the present process the initiator is charged completely at the outset of the polymerization. The initiator is charged at the outset by adding it to the monomer premix with the other ingredients of the reaction mixture. This is particularly true when said premix is homogenized prior to introduction into the reactor. However, when adding the initiator to the monomer premix and then homogenizing, it is necessary that the temperature during the premixing and homogenization steps be kept below the minimum temperature of reactivity of the particular initiator or initiators being employed. For example, when making a premix of vinyl chloride, water, ammonium salt of the fatty acid and the alcohol, and then adding t-butyl peroxypivalate thereto, the temperature is maintained at 25° C. during the mixing step and then during the homogenization step. Upon introduction of the homogenized mixture into the polymerization reactor, the temperature is then raised to that at which the reaction is to take place.

The temperature of reaction in the instant polymerization process is important since the intrinsic viscosity (IV) is a direct function of the temperature of reaction. That is, the higher the temperature the lower the IV. Accordingly, the end use for the resin to be produced will normally dictate the reaction temperature. For example, when producing dispersion resins to be used in coatings or casting flexible films, a lower temperature will be used in order to attain a higher IV which is desirable for many coating applications. We have found that for the end uses to which the dispersion resins are particularly adapted, polymerization temperatures in the range of about 30° C. to about 70° C. are satisfactory. It is preferred, however, to employ a temperature in the range of about 40° C. to about 55° C. It should also be pointed out that as the temperature of reaction is increased, the polymer build-up increases. However, the build-up is not of the hard crusty type and can readily be removed by rinsing or hosing down with water and without opening the reactor when appropriate spray nozzles are installed in the reactor. On the other hand, even this build-up can be controlled to a certain extent by keeping the walls of the reactor cool during the polymerization reaction, especially during the early stage of the reaction. In other words, the initial stage of the reaction is carried out at a low temperature, for example, from 30° to 40° C., and thereafter the temperature of the reaction is raised to attain the desired IV in the resultant dispersion resin. This can be accomplished by normal means, such as employing a jacketed reactor with circulating cool water or other liquid in the jacket. Using such a technique it is possible to polymerize at higher temperatures to obtain desirable low IV dispersion resins and at the same time have reduced polymer build-up. For example, when the polymerization reaction medium is at a temperature of about 42° C., water at a temperature of about 15° C. would be circulated through the jacket. Upon completion of the polymerization reaction, the dispersion resin is isolated in powder form from the latex by means of spray drying. That is, a fine spray of the polymer latex is injected into a heated air chamber thereby removing the water and recovering the dried resin in powder form.

Plastisols are made with the dispersion resins of the present invention by uniformly blending or intimately mixing, by conventional means, with 100 parts by weight of the dispersion resin in powder form, from about 30 to about 100 parts by weight of one or more plasticizers. The useful plasticizers may be described as the alkyl and alkoxy alkyl esters of dicarboxylic acids or the esters of a polyhydric alcohol and monobasic acid. As examples of such materials, there may be named dibutyl phthalate, dioctyl phthalate, dibutyl sebacate, dinonyl phthalate, di(2-ethyl hexyl)phthalate, di(2-ethyl hexyl)adipate, dilauryl phthalate, dimethyl tetrachlorophthalate, butyl phthalyl butyl glycollate, glyceryl stearate, and the like. The preferred plasticizers are the liquid diesters of aliphatic alcohols having from 4 to 20 carbon atoms and dibasic carboxylic acids having from 6 to 14 carbon atoms.

The plastisols made from the dispersion resins of the instant invention should have the desired yield and preferably with little or no dilantency. Yield is simply defined as resistance to flow and is normally determined numerically through viscosity measurements employing well known stanadard techniques. Normally such values are arrived at by calculation from viscosity measurements using a Brookfield Model RVF Viscometer according to ASTM method D1824-61T. Yield is determined from viscosity measurements of the plastisols at varying r.p.m.'s (revolutions per minute) after initial preparation and at intervals of aging. The viscosity is measured in centipoises (cps.) at a temperature of 23° C. In the specific examples, that follow hereinafter, viscosity measurements were made at 2 rpm. and 20 rpm. and are expressed as $V_2$ and $V_{20}$, respectively.

To further illustrate the present invention, the following specific examples are given, it being understood that this is merely intended in an illustrative and not a limitative sense. In the examples all parts and percents are by weight unless otherwise indicated.

EXAMPLE I

In this example, a series of runs were made to show the effect of using saturated alcohols of varying chain lengths. In each case the following recipe was used with the exception of the alcohol which was varied in each run. All the figures are in parts by weight based on the weight of the total composition.

| | |
|---|---|
| Vinyl chloride | 100.0 |
| Water (demineralized) | 125.0 |
| Lauric acid | 2.0 |
| NH$_4$OH | 0.244 |
| Tert-butyl peroxypivalate | 0.04 |
| Alcohols | Variable |

In each of the runs a monomer premix tank or vessel was evacuated. Then the premix tank was charged with the water and then, under agitation, with the lauric acid and NH$_4$OH followed by the alcohol and the tert-butyl peroxypivalate, and lastly, the vinyl chloride. The temperature in the premix tank was controlled at about 25° C. by means of a cooling jacket. The mixture was thereafter agitated for 15 minutes. Thereafter the mixture (monomer premix) was passed through a Manton Gaulim 2 stage homogenizer at a temperature of 25° C. into the polymerization reactor which had previously been evacuated. The pressure in the first stage of the homogenizer was 600 psig. and in the second stage was 700 psig. Thereafter the contents of the reactor were heated to the polymerization temperature, namely, 45° C. and held there throughout the reaction until the desired conversion was obtained (evidenced by a drop in pressure to 50 psig.). Thereafter the reactor was cooled, vented and emptied. The coagulum, scrapings and reactor conditions were recorded. The pertinent data is recorded in Table I below.

In order to determine RVF Viscosity, plastisols were made with the resin or polyvinyl chloride (PVC) of each run using the following recipe:

| | |
|---|---|
| PVC | 100 parts |
| Dioctyl phthalate | 40 parts |
| Dioctyl adipate | 30 parts |
| Epoxidized soybean oil | 5 parts |
| Ca-Zn phosphite | 3 parts |

The data with respect to viscosity is likewise recorded in the following Table I.

TABLE NO. I

| Run No. | 1 | 2 | 3 | 4 | 5 | 6 |
|---|---|---|---|---|---|---|
| Alcohol 6 c's | 2.1 | — | — | — | — | — |
| Alcohol 8 c's | — | 2.1 | — | — | — | — |
| Alcohol 10 c's | — | — | 2.1 | — | — | — |
| Alcohol 12 c's | — | — | — | 2.1 | — | — |
| Alcohol 14 c's | — | — | — | — | 2.1 | — |
| Alcohol 16 c's | — | — | — | — | — | 2.1 |
| Alcohol 18 c's | — | — | — | — | — | — |
| Alcohol 20 c's | — | — | — | — | — | — |
| Alcohol 22 c's | — | — | — | — | — | — |
| Alcohol 12 c's + 18 c's | — | — | — | — | — | — |
| Alcohol 14 c's + 18 c's | — | — | — | — | — | — |
| % Conversion | 56 | 45 | 86 | 81 | 90 | 86 |
| Reactor Buildup | | | | | | |
| Walls | C | 1-2" | 1/2" | 1-1-1/2" | 1/8-1/4" | Light Film |

TABLE NO. I-continued

| | | | | | | |
|---|---|---|---|---|---|---|
| Shaft | O | 1-2" | 1/2-1" | 1-1-1/2" | 1/8" | 1/16-1/8" |
| Blades | A | 1/2" | 1/2-1" | 1-1-1/2" | 1/4" | 1/16"Spotty |
| Bottom | G | 1-2" | 1/2" | 1-1-1/2" | 1/8" | 1/16" |
| Cagulum, % | U | Too Thick | Too Thick | Too Thick | 0.6 | 0.08 |
| Scrapings, % | L | " | " | 7.0 | 0.6 | 0.08 |
| | A | | | | | |
| Sedimentation, % | T | | | | | |
| 1 hour | E | 7 | 0 | Too | 0 | 0 |
| 4 hours | D | 8 | 0 | Thick | 0 | 0 |
| 1 day | | 9 | 0 | | 0 | 0 |
| 4 days | | 9 | 0 | | 0 | 0 |
| Slurry pH | | 9.0 | 9.4 | 9.4 | 9.5 | 8.7 |
| Surface Tension | | 28.2 | 26.8 | 26.7 | 28.8 | 35.6 |
| Total Solids, % | | 19.6 | 39.5 | 37.0 | 41.0 | 38.4 |
| Plastisol Mix | | | | | | |
| Brookfield RVF Visc.,cps | | | | | | |
| Initial $V_2$ | | Too | 24,000 | | 8,500 | 34,000 |
| $V_{20}$ | | Thick | 14,500 | | 22,850 | 41,000 |
| 1 Day $V_2$ | | Could | 120,000 | Could | 42,000 | 430,000 |
| $V_{20}$ | | Not | 41,600 | Not | 55,000 | 185,000 |
| 1 Week $V_2$ | | Dry | 212,000 | Dry | 208,000 | Not |
| $V_{20}$ | | | 72,000 | | 126,000 | Run |

| Run No. | 7 | 8 | 9 | 10 | 11 | 12 |
|---|---|---|---|---|---|---|
| Alcohol 6 c's | — | — | — | — | — | — |
| Alcohol 8 c's | — | — | — | — | — | — |
| Alcohol 10 c's | — | — | — | — | — | — |
| Alcohol 12 c's | — | — | — | — | — | — |
| Alcohol 14 c's | — | — | — | — | — | — |
| Alcohol 16 c's | — | — | — | — | — | — |
| Alcohol 18 c's | 2.1 | — | — | — | — | — |
| Alcohol 20 c's | — | 2.1 | — | — | — | — |
| Alcohol 22 c's | — | — | 2.1 | — | — | — |
| Alcohol 12c's + 8c's | — | — | — | 2.1 | — | — |
| Alcohol 14c's + 8c's | — | — | — | — | 2.1 | — |
| Alcohol 16c's + 8c's | — | — | — | — | — | 2.1 |
| % Conversion | 89 | 88 | 86 | 88 | 85 | 86 |
| Reactor Buildup | | | | | | |
| Walls | 1/16" | 1/16" | 3/8-5/8" | 1/16-1/8" | 1/16" | 1/16" |
| Shaft | 1/16" | 1/16" | 1/2-3/4" | 1/8" | 1/4" Spotty | 1/16" |
| Blades | 1/16-1/8" | 1/8-1/4" | 1/2-1" | 1/8" | 1/4" | 1/16" |
| Bottom | 1/16" | 1/16" | 3/8" | 1/16" | 1/8" | 1/16" |
| Coagulum | 0 | 0 | 0.75 | 0.1 | <0.001 | 0 |
| Scrapings, % | 0.07 | 0.4 | 2.0 | 0.04 | <0.001 | <0.001 |
| Sedimentation, % | | | | | | |
| 1 hour | 0 | 0 | 0 | 0 | 0 | 0 |
| 4 hours | 0 | 0 | 0 | 0 | 0 | 0 |
| 1 day | 0 | 0 | 0 | 0 | 0 | 0 |
| 4 days | 0 | 0 | 1 | 0 | 0 | 0 |
| Slurry pH | 9.2 | 9.3 | 9.2 | 8.9 | 8.8 | 9.6 |
| Surface Tension | 36.0 | 38.8 | 39.8 | 26.9 | 29.2 | 32.5 |
| Total Solids, % | 40.5 | 39.8 | 39 | 40.0 | 39.5 | 39.0 |
| Plastisol Mix | | | | | | |
| Brookfield RVF Visc.,cps | | | | | | |
| Initial $V_2$ | 14,500 | 7,000 | 5,000 | Not | 8,700 | 14,000 |
| $V_{20}$ | 24,000 | 3,950 | 9,400 | Run | 6,620 | 7,770 |
| 1 Day $V_2$ | 180,000 | 25,000 | 18,500 | | 26,000 | 126,000 |
| $V_{20}$ | 85,000 | 10,750 | 9,700 | | 16,500 | 30,700 |
| 1 Week $V_2$ | Not | 56,000 | 72,000 | | | |
| $V_{20}$ | Run | 24,200 | 25,000 | | | |

It can be seen from the above results that the new improved properties in the products of the instant invention are not obtained to satisfaction until the chain length of the alcohol reaches 14 carbon atoms. It is also at this point that a significant reduction in polymer buildup is observed. These runs clearly illustrate the advantage of the present invention.

EXAMPLE II

In this Example, 2 runs were made to show that $NH_4$ laurate gives improved water resistance, clarity and plastisol viscosity compared to alkali metal laurates. Using the polymerization procedure of Example I, the following recipes were polymerized:

| Run No. | 13 | 14 |
|---|---|---|
| Vinyl chloride | 100 parts | 100 parts |
| Water (demineralized) | 125 parts | 125 parts |
| Alcohol 12 c's + 18 c's | 2.1 parts | 2.1 parts |
| $NH_4$ laurate | — | 2.0 parts |
| Potassium laurate | 2.0 parts | — |
| t-butyl peroxypivalate | 0.05 part | 0.05 part |

In order to determine the improved properties, plastisols were made with the resin or polyvinyl chloride (PVC) of each run using the following recipe:

| | |
|---|---|
| PVC | 100 parts |
| Dioctyl phthalate | 40 parts |
| Dioctyl adipate | 30 parts |
| Epoxidized soybean oil | 5 parts |
| Ba-Cd-Zn stabilizer | 3 parts |

Films having a 0.02 inch thickness were made from the plastisols and water-whitening resistance and heat stability thereof were measured using the following procedures:

For the water-whitening test, each film was heated for 5 minutes at 350° F. Thereafter, the film was exposed to 100% relative humidity at 75° F. for 72 hours. Film whitening occurred during this time. Thereafter, the films were exposed to 50% relative humidity at 73° F. to allow recovery of film clarity. The reflectance was measured after 0, 1, 2 and 3 hours exposure to 50% relative humidity. Measurements were made using a "Photovolt Photoelectric Reflection Meter Model 610" (Photovolt Corporation, New York, N.Y.) and an 89% reflectance working standard. Percent clarity recovery was measured by dividing a test reflectance value by the reflectance value before moisture exposure and multiplying the quotient by 100. The more water-resistant films had higher percent clarity recovery numbers.

The heat stability was measured on the plastisol films by heating the same for 5 minutes at 350° F. Each film was heated thereafter for 45 minutes at 375° F. in a circulating air oven. The reflectance was measured using the Photovolt Reflection Meter, referred to above, and an 89% reflectance working standard. Lower reflectance readings indicated poor film heat stability, i.e., as a film sample darkened, the reflectance reading decreased. The results of all the tests are set out in the following table:

TABLE NO. II

| Run No. | Water Resistance (at 100% Relative Humidity) | |
|---|---|---|
| | 13 | 14 |
| % Reflectance | | |
| Initial | 68% | 75% |
| 3 day exposure | 0% | 3% |
| Recovered at 73° F./50% Relative Humidity | | |
| 1 Hour | 0% | 28% |
| 2 Hours | 0% | 58% |
| 3 Hours | 0% | 72% |
| % Recovery in 1 Hour | 0% | 37% |
| % Recovery in 3 Hours | 0% | 96% |
| Heat Stability at 375° F. | | |
| 5 minutes | 68.5 | 83.0 |
| 15 minutes | 74.0 | 82.5 |
| 30 minutes | 45.0 | 82.5 |
| 45 minutes | 2.0 | 81.0 |
| Plastisol Viscosity RVF, 2 rpm, cps. | | |
| Initial | 25,600 | 11,000 |
| 1 Week | 980,000 | 32,000 |

This Example clearly shows the superior and unexpected results obtained when ammonium laurate is employed rather than an alkali metal laurate.

EXAMPLE III

In this Example, 3 runs were made which show that branched alcohols significantly increase coagulum and polymer buildup. Using the procedure of Example I, three recipes were polymerized and designated as Runs 15, 16 and 17. With the exception of the alcohols, the following recipe was used in all three runs:

| | |
|---|---|
| Vinyl chloride | 100 parts |
| Lauric acid | 2 parts |
| Ammonium hydroxide (28%) | 0.33 part |
| Tert-butyl peroxypivalate | 0.05 part |
| Water (demineralized) | 125 parts |

Run 15 was made using a mixture of straight chain alcohols whereas Runs 16 and 17 contained branched alcohols. Neodol 25 and 45 are made by Shell Oil Co. Neodol 25 contains 25% branched alcohol with methyl groups in the second position with a slight amount of propyl and butyl groups on the chain. The alcohols vary in chain length from $C_{12}$ to $C_{15}$. Neodol 45 is the same except that it contained 28% branched alcohol and chain lengths of $C_{14}$ and $C_{15}$. The coagulum and reactor conditions were recorded. The pertinent data is recorded in Table III below.

In order to determine RVF Viscosity, plastisols were made with the PVC of each run using the following recipe:

| | |
|---|---|
| PVC | 100 parts |
| Dioctyl phthalate | 57 parts |
| Epoxidized soybean oil | 3 parts |
| Ba-Zn Stabilizer | 2 parts |

The data with respect to viscosity is likewise recorded in the following Table III.

TABLE NO. III

| Run No. | 15 | 16 | 17 |
|---|---|---|---|
| Alcohol 12 c's + 18 c's (straight chain) | 2.1 pts. | | |
| Alcohol 12 c's + 15 c's (branched) | | 2.1 pts. | |
| Alcohol 14 c's + 15 c's (branched) | | | 2.1 pts. |
| Polymerization Results | | | |
| % Conversion | 85 | 66 | 77 |
| Polymerizer Condition | | | |
| Before Hosing Walls | Light sand | 1/16"–1/14" | 1/8"–1/4" |
| Before Hosing Shaft | 1/8" | 1/2"–3/8" | 1/4"–1/2" |
| Before Hosing Blades | 1/8" | 1/2"–3/8" | 1/4"–1/2" |
| Before Hosing Bottom | Light sand | 3"–(gravel) | 1/8"–1/4" |
| After Hosing Walls | Light paper | 1/16"–1/4" spotty | 1/8"–1/4" |
| After Hosing Shaft | 1/32" | 1/4"–1/2" | 1/4" |
| After Hosing Blades | 1/32" | 1/2–3/8" | 1/4"–1/2" |
| After Hosing Bottom | Light paper | Light paper | 1/8"-spotty |
| % Hosed down | 85 | 50 | 65 |
| Wt. Hosed down | 82 gms. | Not weighed | 1.9 lbs. |
| Coagulum - % | 0.1 | Could not strain | Could not strain |
| - weight | 38 gms. | — | — |
| Slurry pH | 9.6 | 9.4 | 9.4 |
| Sedimentation | | | |
| 1 Hour | 0 | 0 | 0 |
| 4 Hours | 0 | 0 | 0 |
| 1 Day | 0 | 1 | 1 |
| 7 Days | 0 | 32 | 12 |
| Plastisol Evaluation | | | |
| Brookfield RVF Visc., cps | | | |
| Initial $V_2$ | 100,000 | 1,360,000 | 260,000 |
| $V_{20}$ | 60,000 | Overscale | 124,000 |
| 1 Day $V_2$ | 460,000 | Too Viscous | Too Viscous |
| $V_{20}$ | Overscale | | |

The results in Table III clearly show that the beneficial results of the present invention cannot be obtained with the use of branched alcohols. The alcohol must be a long straight chain saturated alcohol containing from 14 to 24 carbon atoms.

While the present invention has been described in terms of its specific embodiments, certain modifications and equivalents will be apparent to those skilled in the art and are intended to be included within the scope of the present invention, which is to be limited only by the reasonable scope of the appended claims.

We claim:

1. A process for producing polymers of vinyl and vinylidene halides and copolymers thereof with each other or either with one or more vinylidene monomers having at least one terminal $CH_2=C<$ grouping comprising forming a monomer premix containing the monomer or monomers to be polymerized, the aqueous reaction medium, from about 0.01% to about 0.5% by weight of a free radical yielding catalyst based on the weight of 100 parts of monomer or monomers being polymerized, said catalyst being free of alkali metals, an ammonium salt of a saturated fatty acid containing from 8 to 20 carbon atoms, and at least one long straight chain saturated alcohol containing from 14 to 24 carbon atoms, and wherein the ratio of alcohol to fatty acid is greater than 1.0, homogenizing said premix at a temperature below the reactivity of the catalyst or catalysts employed, passing said homogenized premix to a reaction zone, emulsion polymerizing said homogenized premix in said zone at a temperature in the range of about 30° C. to about 70° C., maintaining the pH in the reaction zone in the range of 7.0 to about 12.0 until the reaction is complete, and thereafter recovering the polymer or copolymer, whereby polymer build-up in said reaction zone is substantially reduced.

2. A process as defined in claim 1 wherein the ammonium salt is ammonium laurate.

3. A process as defined in claim 1 wherein the monomer in the premix is vinyl chloride.

4. A process as defined in claim 1 wherein the ammonium salt is formed in situ in the monomer premix by adding to the premix the fatty acid and an excess over the equimolar amount of ammonium hydroxide.

5. A process as defined in claim 4 wherein the fatty acid is lauric acid.

6. A process as defined in claim 1 wherein the catalyst is tert-butyl peroxypivalate.

7. A process as defined in claim 1 wherein the long chain saturated alcohol is one containing 16 carbon atoms.

8. A process as defined in claim 1 wherein the ammonium salt is ammonium stearate.

9. A process as defined in claim 1 wherein the catalyst is lauroyl peroxide.

10. A process as defined in claim 5 wherein the monomer in the premix is vinyl chloride.

11. A process as defined in claim 10 wherein the catalyst is tert-butyl peroxypivalate.

12. A process as defined in claim 11 wherein the pH in the reaction zone is in the range of about 8.0 to about 10.5.

13. A process as defined in claim 12 wherein the temperature in the homogenizing step is 25° C.

14. A process as defined in claim 13 wherein the temperature in the reaction zone is 45° C.

* * * * *